United States Patent
Lafferty et al.

(10) Patent No.: US 10,493,880 B2
(45) Date of Patent: Dec. 3, 2019

(54) TRIM-COVER FASTENER FOR VEHICLE SEAT

(71) Applicant: FAURECIA AUTOMOTIVE SEATING, LLC., Troy, MI (US)

(72) Inventors: Lola Lafferty, Capac, MI (US); Benoit Gazaniol, Arpajon (FR); Olivier Boinais, West Bloomfield, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 284 days.

(21) Appl. No.: 15/507,857

(22) PCT Filed: Sep. 11, 2015

(86) PCT No.: PCT/US2015/049573
§ 371 (c)(1),
(2) Date: Mar. 1, 2017

(87) PCT Pub. No.: WO2016/040734
PCT Pub. Date: Mar. 17, 2016

(65) Prior Publication Data
US 2017/0305316 A1    Oct. 26, 2017

Related U.S. Application Data

(60) Provisional application No. 62/048,958, filed on Sep. 11, 2014.

(51) Int. Cl.
*B60N 2/58* (2006.01)
(52) U.S. Cl.
CPC .......... *B60N 2/5825* (2013.01); *B60N 2/5816* (2013.01)

(58) Field of Classification Search
CPC ...... B60N 2/58; B60N 2/5825; B60N 2/5841; B60N 2/5858; B60N 2/5883; B60N 2/6027; B60N 2/6045; B60N 2/6063; B60N 2/609; B60N 2/5816; A47C 4/30; A47C 4/06; A47C 4/24; A47C 4/26; A47C 5/06;
(Continued)

(56) References Cited

U.S. PATENT DOCUMENTS 1,916,856 A * 7/1933 Copeman ................ D06F 55/00
24/560
1,940,636 A * 12/1933 Stubnitz ................. B68G 15/00
160/392
(Continued)

FOREIGN PATENT DOCUMENTS

DE    2321340 A    12/1973
DE    3831636 C1    9/1989
(Continued)

OTHER PUBLICATIONS

Translation of German Office Action for German Patent App. No. DE 11 2015 003 590.7, 3735 DE ||, 7 pages.
(Continued)

*Primary Examiner* — Kyle J. Walraed-Sullivan
(74) *Attorney, Agent, or Firm* — Barnes & Thornburg LLP

(57) ABSTRACT

A trim-cover fastener is provided to couple a trim cover to a seat pan to form a seat bottom or a seat back of a passenger seat. Trim-cover fastener includes one piece coupled to the trim cover and another piece coupled to the seat pan.

20 Claims, 2 Drawing Sheets

(58) Field of Classification Search
CPC ..... A47C 31/023; B60R 13/0206; F16B 2/22; F16B 5/0692; Y10T 24/44897
USPC ....... 52/716.1, 716.3, 716.4, 717.03, 717.05; 297/452.6
See application file for complete search history.

(56) References Cited

U.S. PATENT DOCUMENTS

| | | | | |
|---|---|---|---|---|
| 2,146,190 | A * | 2/1939 | Luke | B65D 45/18 210/473 |
| 3,683,462 | A * | 8/1972 | Voigt | A63C 11/021 24/564 |
| 3,928,898 | A * | 12/1975 | Smoot | A47C 31/023 24/532 |
| 4,055,874 | A * | 11/1977 | Brown | B42F 1/10 24/560 |
| 4,148,114 | A * | 4/1979 | Wier | B42F 1/02 24/564 |
| 5,195,222 | A * | 3/1993 | Rink | A47C 31/023 24/581.1 |
| 5,606,777 | A * | 3/1997 | Lu | B42F 1/06 24/545 |
| 5,638,584 | A * | 6/1997 | De Anfrasio | B62J 7/08 24/265 H |
| 6,237,934 | B1 * | 5/2001 | Harrell | B60R 21/207 280/728.3 |
| 6,612,648 | B1 * | 9/2003 | Hashiguchi | B60N 2/5825 297/218.1 |
| 7,073,693 | B2 * | 7/2006 | Law | B60N 2/5883 223/50 |
| 7,195,274 | B2 * | 3/2007 | Tracht | B60R 21/207 280/728.3 |
| 7,891,735 | B2 * | 2/2011 | Oku | B60N 2/6009 297/218.3 |
| 8,157,324 | B2 * | 4/2012 | Matsuzaki | B60N 2/5816 297/218.1 |
| 8,240,759 | B2 * | 8/2012 | Hobl | B60N 2/5825 297/218.1 |
| 8,636,452 | B2 * | 1/2014 | Summer | B26D 3/001 410/101 |
| 8,926,013 | B2 * | 1/2015 | Kurashita | B60N 2/7011 297/218.3 |
| 9,061,618 | B2 * | 6/2015 | Nakagawa | B60N 2/58 |
| 10,023,086 | B2 * | 7/2018 | Etienne | B60N 2/5825 |
| 10,065,577 | B2 * | 9/2018 | Braggion | B60R 13/0206 |
| 2003/0151280 | A1 * | 8/2003 | Hashiguchi | B60N 2/5825 297/218.1 |
| 2004/0227335 | A1 * | 11/2004 | Acker | B60N 2/5841 280/730.2 |
| 2005/0008353 | A1 | 1/2005 | Lafitte | |
| 2008/0224509 | A1 * | 9/2008 | Demick | B60N 2/5825 297/218.2 |
| 2012/0038200 | A1 * | 2/2012 | Stankiewicz | B60N 2/5825 297/452.59 |
| 2014/0239697 | A1 * | 8/2014 | Nii | B60N 2/58 297/452.61 |
| 2014/0312664 | A1 * | 10/2014 | Tanabe | B60R 21/207 297/216.13 |
| 2015/0183350 | A1 * | 7/2015 | Schittko | B60N 2/5825 297/452.48 |
| 2015/0307002 | A1 * | 10/2015 | Ushiyama | B60N 2/6009 297/452.59 |
| 2016/0280106 | A1 * | 9/2016 | Sato | B60N 2/6027 |
| 2016/0280107 | A1 * | 9/2016 | Sato | B29C 45/0025 |
| 2016/0375806 | A1 * | 12/2016 | Etienne | B60N 2/5891 297/452.38 |
| 2016/0375807 | A1 * | 12/2016 | Kageyama | B60N 2/5883 297/452.61 |
| 2017/0240082 | A1 * | 8/2017 | Yokoyama | A47C 31/02 |
| 2017/0305316 | A1 * | 10/2017 | Lafferty | B60N 2/5825 |
| 2018/0022255 | A1 * | 1/2018 | Abe | B60N 2/5883 297/452.58 |
| 2018/0037144 | A1 * | 2/2018 | Makita | A47C 31/02 |

FOREIGN PATENT DOCUMENTS

| | | |
|---|---|---|
| DE | 3831636 C1 | 9/1989 |
| DE | 3841531 A1 | 6/1990 |
| DE | 10359556 A1 | 7/2005 |
| DE | 102005057415 A1 | 7/2006 |
| DE | 602004006818 T2 | 1/2008 |
| FR | 2828455 A1 | 2/2003 |
| GB | 2420706 A | 6/2006 |
| GB | 2420706 A | 6/2006 |
| GB | 2426034 B | 11/2006 |
| GB | 2493822 A | 2/2013 |
| GB | 2493822 A | 2/2013 |
| JP | 2003024188 A | 1/2003 |
| WO | 2014001690 A1 | 1/2014 |

OTHER PUBLICATIONS

German Office Action for German Patent App. No. DE 11 2015 003 590.7, 3735 DE ‖, 10 pages.
Chinese Office Action for Chinese App. No. 201580052705.0 dated Oct. 25, 2018, 3735 CN ‖, 11 pages.
PCT International Search Report and Written Opinion completed by the ISA/EP dated Dec. 1, 2015 and issued in connection with PCT/US2015/049573.
Chinese Office Action for Chinese App. No. 201580052705.0 dated Aug. 15, 2019, 3735 CN ‖, 10 pages.

* cited by examiner

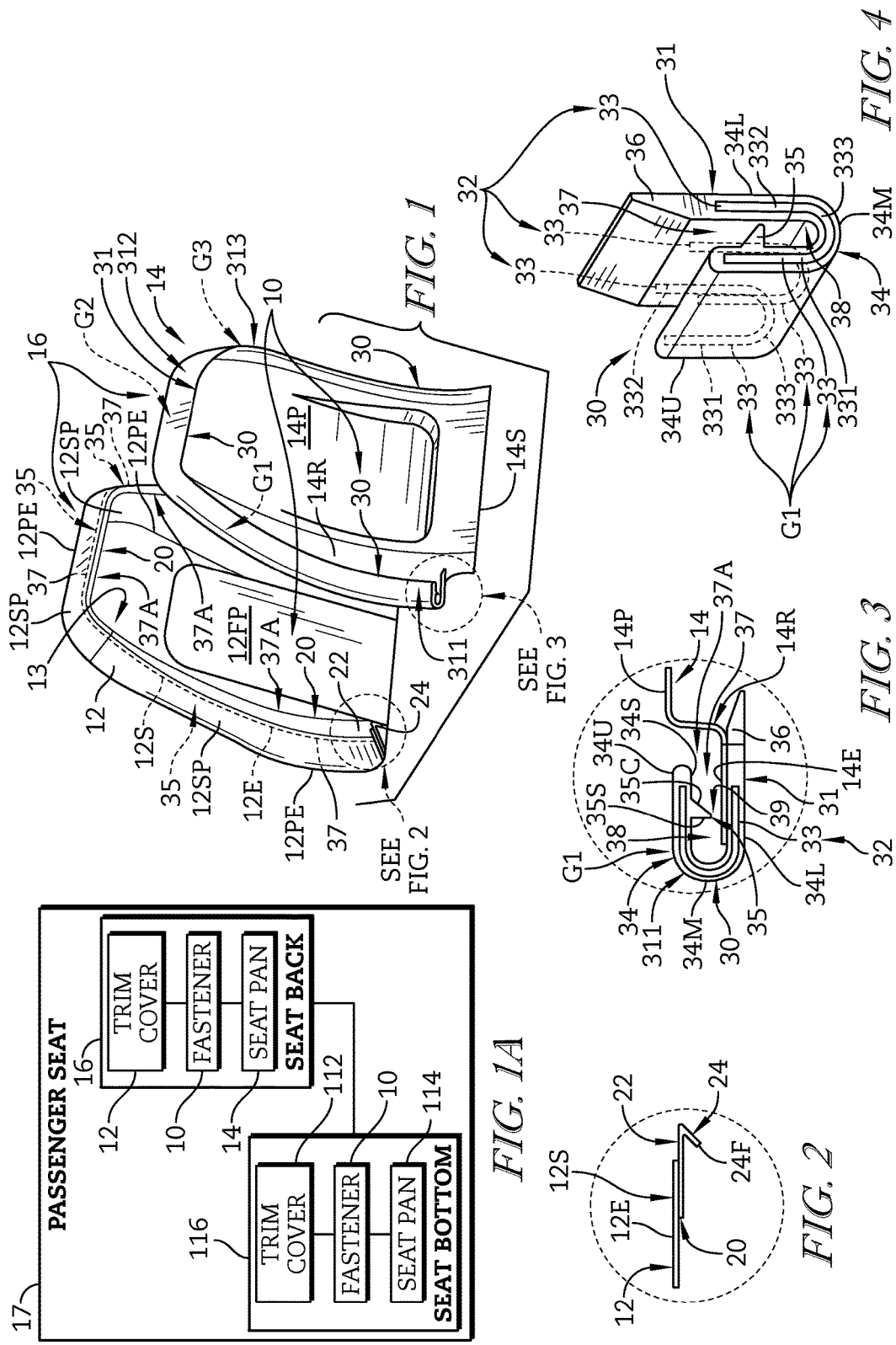

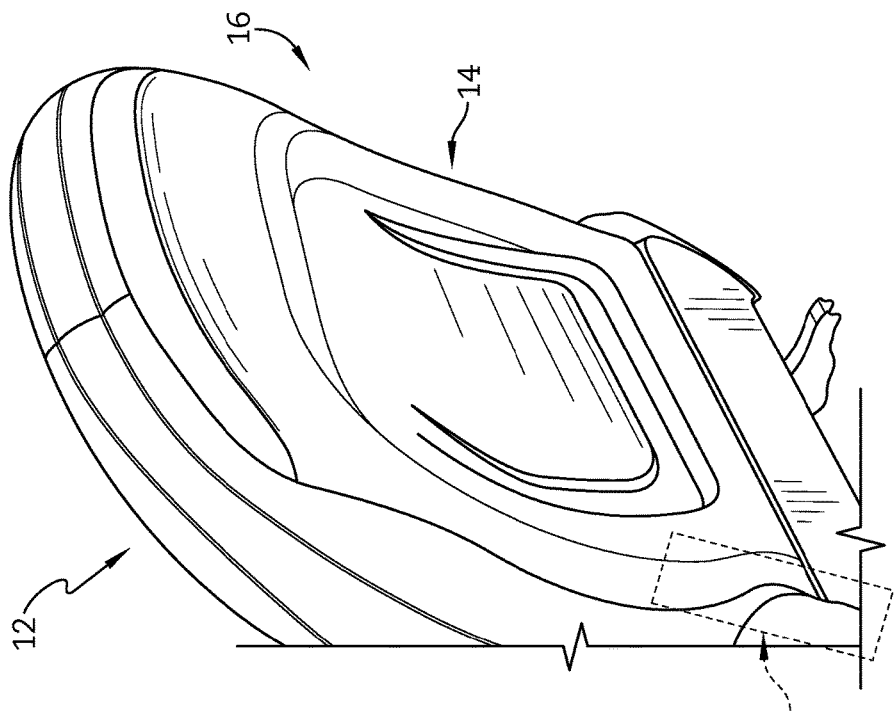
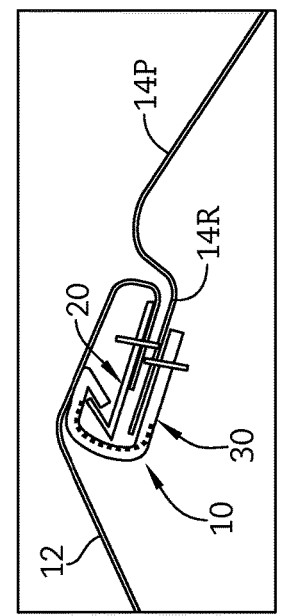
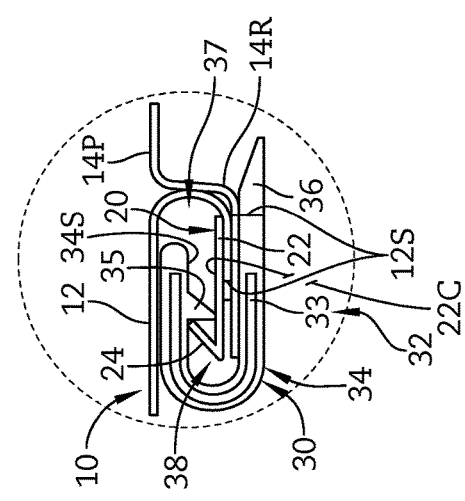

TRIM-COVER FASTENER FOR VEHICLE SEAT

CROSS REFERENCE TO RELATED APPLICATIONS

This application is a U.S. national stage application of international application No. PCT/US2015/049573 filed Sep. 11, 2015, which claims priority to U.S. Provisional Application Ser. No. 62/048,958, filed Sep. 11, 2014. The entire disclosures of PCT/US2015/049573 and U.S. Ser. No. 62/048,958 are hereby incorporated by reference.

BACKGROUND

The present disclosure relates to a trim-cover fastener, and particularly to a vehicle seat including a seat pan and a seat cover for the seat pan. More particularly, the present disclosure relates to a fastener for fastening the seat cover to the seat pan.

SUMMARY

According to the present disclosure, a vehicle seat includes two occupant-support bases and a seat foundation for the occupant-support bases. One of the occupant-support bases is configured to provide a seat bottom arranged to lie above the seat foundation. The other occupant-support base is configured to provide a seat back extending upwardly from the seat bottom.

In illustrative embodiments, an occupant-support base of a vehicle seat includes a seat pan, a trim cover for the seat pan, and a trim-cover fastener configured to couple the trim cover to the seat pan. In one illustrative embodiment, the seat pan is a backrest arranged to support the back of an occupant of the vehicle seat and the trim cover is coupled to the backrest using a trim-cover fastener in accordance with the present disclosure to form a seat back. In another illustrative embodiment, the seat pan is a bottom frame arranged to support the hips and upper legs of an occupant of the vehicle seat and the trim cover is coupled to the bottom frame using a trim-cover fastener in accordance with the present disclosure to form a seat bottom.

In illustrative embodiments, the trim-cover fastener comprises a deformable key coupled to the trim cover at a join seam and a key retainer coupled to a semi-rigid back panel included in the backrest. The deformable key has an arrow profile and includes a flange-support strip coupled to a rear perimeter edge of the trim cover at the join seam and an elastic arrowhead flange coupled to a free end of the flange-support strip and configured to extend into a flange-receiver channel formed in the key retainer. The key retainer comprises a sleeve rigidifier including a series of laterally spaced-apart coil inserts and an open-sided sleeve made of a plastics material overmolded onto the series of laterally spaced-apart coil inserts to have a J-shaped profile and to define the flange-receiver channel.

In illustrative embodiments, the open-sided sleeve of the key retainer of the trim-cover fastener includes a bight that is overmolded onto the series of laterally spaced-apart coil inserts. The open-side sleeve also has a U-shaped cross-section and includes a motion-blocker ridge coupled to the bight and arranged to extend into the flange-receiver channel to block removal of the elastic flange of the key from the flange-receiver channel after mating engagement of the key and the key retainer to hold the trim cover in a mounted position on the backrest (seat pan). A pan-mount portion is also included in the open-sided sleeve and coupled to the bight and to a rear perimeter edge of the back panel of the backrest (seat pan).

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is an exploded perspective assembly view of illustrative components included in a seat back in accordance with the present disclosure showing that the seat back includes a backrest (seat pan) (on the right), a trim cover (on the left), and a trim-cover fastener comprising (1) a J-shaped key retainer coupled to a U-shaped rim of a back panel included in the backrest (seat pan) and (2) an arrow-shaped deformable key coupled to a U-shaped side panel of the trim cover at a join seam;

FIG. 1A is a diagrammatic view of a passenger seat comprising a seat bottom including a seat pan (bottom frame), a trim cover, and a trim-cover fastener in accordance with the present disclosure, and a seat back including a seat pan (backrest), a trim cover, and a trim-cover fastener in accordance with the present disclosure;

FIG. 2 is an enlarged sectional view of a portion of the trim cover and a portion of the arrow-shaped deformable key of the trim-cover fastener taken from one of the circled regions of FIG. 1;

FIG. 3 is an enlarged sectional view of a portion of the back panel and a portion of the J-shaped key retainer of the trim-cover fastener taken from another of the circled regions of FIG. 1;

FIG. 4 is an enlarged perspective view of a portion of the J-shaped key retainer of FIGS. 1 and 3 showing that the key retainer includes an open-sided sleeve overmolded onto a sleeve rigidifier comprising a series of laterally spaced-apart coil inserts and formed to include a motion-blocker ridge arranged to extend into a flange-receiver cavity sized to receive and retain an elastic arrowhead flange included in the arrow-shaped deformable key as suggested in FIG. 7;

FIG. 5 is a perspective view of a portion of a seat back after the trim cover of FIG. 1 is mounted on the backrest (seat pan) of FIG. 1;

FIG. 6 is an enlarged sectional view of the indicated region of the seat back shown in FIG. 5 showing a diagrammatic representation of the arrow-shaped deformable key mated with the key retainer to form a trim-cover fastener in accordance with the present disclosure; and FIG. 7 is a sectional view showing mating engagement of the arrow-shaped key of FIG. 2 and the J-shaped key retainer of FIG. 3 to form a trim-cover fastener in accordance with the present disclosure that functions to hold the trim cover in place on the back panel of the backrest (seat pan) as suggested in FIG. 5.

DETAILED DESCRIPTION

A trim-cover fastener 10 in accordance with the present disclosure is provided to couple a soft trim cover 12 to a semi-rigid or plastic part such as a seat pan (backrest) 14 to form a seat back 16 as suggested in FIGS. 1-3 and 5. Trim-cover fastener 10 can also be used to couple a trim cover 112 to a seat pan (bottom frame) 114 to form a seat bottom 116 as suggested diagrammatically in FIG. 1A. Seat back 16 and seat bottom 116 cooperate to form a seat 17 such as a passenger seat in a vehicle as suggested in FIG. 1A.

Trim-cover fastener 10 comprises a deformable key 20 shown, for example, in FIG. 2 and a key retainer 30 shown, for example, in FIG. 3. In illustrative embodiments, key 20 is coupled to trim cover 12 at a join seam 12S as suggested in FIGS. 1 and 2 and key retainer 30 is coupled to a backrest (seat pan) 14 as suggested in FIGS. 1 and 3. Key 20 on trim cover 12 is configured to be mated with key retainer 30 on backrest (seat pan) 14 as suggested in FIGS. 5-7 to mount trim cover 12 on backrest (seat pan) 14 to form seat back 16.

Key 20 has an arrow profile as suggested in FIG. 2. Key 20 includes a flange-support strip 22 and an elastic flange 24. Key 20 is made, for example, from a polymer or rubber elastomeric material such as polypropylene or polyethylene. Flange-support strip 22 is arranged to extend along and is coupled to a generally U-shaped rear perimeter edge 12E of trim cover 12 using any suitable means (e.g., sewing) as shown, for example, in FIG. 1. Elastic flange 24 has an arrowhead shape and is made of an elastic material. Elastic flange 24 is arranged to cooperate with flange-support strip 22 to define an included angle of about 40° therebetween and has a free end 24F that is arranged to be moved toward flange-support strip 22 during mating engagement of elastic flange 24 of key 20 and key retainer 30.

Trim cover 12 includes a front panel 12FP arranged to face toward the back of a vehicle seat occupant (not shown) resting against seat back 16 and a generally U-shaped side panel 12SP coupled to a perimeter edge 12PE of front panel 12FP as suggested in FIG. 1. Flange-support strip 22 of key 20 is coupled to a free edge of the generally U-shaped side panel 12SP of trim cover 12 as suggested in FIGS. 1 and 2 so that elastic flange 24 is arranged to extend in a direction away from front panel 12FP of trim cover 12. Front panel 12FP and side panel 12SP cooperate to form an interior region 13 sized to receive a portion of backrest (seat pan) 14 therein when trim cover 12 is mounted on backrest (seat pan) 14 as suggested in FIGS. 1 and 5.

Key retainer 30 illustratively comprises an open-sided sleeve 31 having a J-shaped profile and a sleeve rigidifier 32 including a series of laterally spaced-apart coil inserts 33 as suggested in FIGS. 3 and 4. Open-sided sleeve 31 is overmolded onto the series of laterally spaced-apart coil inserts 33 as suggested in FIGS. 3 and 4. Each coil insert 33 is made of a metal material in an illustrative embodiment and could be formed to have any suitable sleeve-rigidifying shape in accordance with the present disclosure.

Open-sided sleeve 31 of key retainer 30 includes a bight 34, a motion-blocker ridge 35 coupled to an interior surface 34S of bight 34, and a pan-mount portion 36 coupled to one end of bight 34 as suggested in FIG. 3. Pan-mount portion 36 of open-sided sleeve 31 also is coupled to backrest (seat pan) 14 using any suitable means (e.g., sewing) as suggested in FIGS. 1 and 3 to anchor key retainer 30 to backrest (seat pan) 14. Pan-mount portion 36 of open-sided sleeve 31 can be configured to match the contour of the adjacent companion backrest (seat pan) 14 to provide a positive location for attachment. Bight 34 and motion-blocker ridge 35 are configured to mate with elastic flange 24 of key 20 as suggested in FIGS. 5-7 to hold trim cover 12 in place on backrest (seat pan) 14. Open-sided sleeve 31 can be shaped to provide a consistent surface to maintain a continuous radius without visible gaps between attachment points on backrest (seat pan) 14.

Backrest (seat pan) 14 includes a back panel 14P made of a semi-rigid material and a back panel support 14S underlying back panel 14P as shown, for example, in FIG. 1. Back panel 14P includes a generally U-shaped rim 14R having a rear perimeter edge 14E that is mated (using any suitable means) with pan-mount portion 36 of open-sided sleeve 31 of key retainer 30 as shown, for example, in FIG. 3. It is within the scope of this disclosure to provide rear perimeter edge 14E with an offset or linear shape.

Bight 34 of open-sided sleeve 31 has a U-shaped cross-section and is formed to include a key-receiver channel 37 arranged to open in a direction facing toward pan-mount portion 36 as suggested in FIG. 3. Interior surface 34S of bight 34 defines a boundary of key-receiver channel 37. Elastic flange 24 of key 20 is sized and shaped to extend into key-receiver channel 37 of key retainer 30 when key 20 is mated to key retainer 30 as suggested in FIGS. 6 and 7.

Motion-blocker ridge 35 of open-sided sleeve 31 is arranged to extend downwardly from an upper leg 34U of bight 34 toward a lower leg 34L of bight 34 as suggested in FIG. 3 to define a flange-retainer cavity 38 between a middle leg 34M of bight 34 and motion-blocker ridge 35. Middle leg 34M is curved and arranged to interconnect upper and lower legs 34U, 34L as suggested in FIG. 3.

Elastic flange 24 is arranged to be passed into flange-receiver channel 37 during mating engagement of key 20 and key retainer 30, then through a throat 39 provided between motion-blocker ridge 35 and an opposing portion of interior surface 34S, and then retained in flange-retainer cavity 38 as suggested in FIG. 7. Motion-blocker ridge 35 includes a sloped cam surface 35C facing toward pan-mount portion 36 and away from middle leg 34M and a flat stop surface 35S facing away from pan-mount portion 36 and toward middle leg 34M. Elastic flange 24 is deformed elastically as it ramps on cam surface 35C of motion-blocker ridge 35 and then snaps back to resume its original arrowhead shape once the elastic flange 24 disengages cam surface 35C and arrives in the flange-retainer cavity 38. At that point, the free end 24F of elastic flange 24 faces toward flat stop surface 35S and engages that surface 35S to block withdrawal of key 20 from key-receiver channel 37 formed in key retainer 30 as suggested in FIG. 7.

Trim-cover fastener 10 is configured in accordance with the present disclosure to align and secure trim cover 12 to a soft or semi-rigid part such as backrest (seat pan) 14. Trim-cover fastener 10 provides flexibility to sew around curved parts made, for example, of a semi-rigid material having a Shore A hardness of about 50 or higher.

Key retainer 30 provides an attachment feature on a semi-rigid part such as a backrest (seat pan) 14 that is not visible when key retainer 30 is coupled to key 20 to hold trim cover 12 in place on a semi-rigid portion of backrest (seat pan) 14 and that semi-rigid portion is not strong enough to be used as a direct attachment point for trim cover 12. Side panel 12SP of trim cover 12 covers key retainer 30 as suggested in FIGS. 1 and 5. Trim cover 12 is sewn to key 20 and key 20 is mated to key retainer 30 to avoid difficult sewing operations.

Key retainer 30 can be attached easily to a semi-rigid part such as a back panel rim portion of backrest (seat pan) 14. Key retainer 30 is flexible to flex easily around radius of rigid parts yet has high retention due to rigidity of metal inserts 33. Key retainer 30 provides consistent surface to maintain continuous radius without visible gaps between attachment points.

A trim-cover fastener 10 in accordance with the present disclosure includes a deformable key 20 and a key retainer 30 as shown, for example, in FIGS. 1-3. Deformable key 20 includes a flange-support strip 22 adapted to mate with a trim cover 12 that is configured to cover a seat pan and cooperate with the seat pan to form an occupant-support base of a vehicle seat. As suggested in FIG. 1A, seat pan 14 is configured to provide a backrest in seat back 16 of passenger seat 17 while seat pan 114 is configured to provide a bottom frame in a seat bottom 116 of passenger seat 17. Trim-cover fastener 10 can be used in accordance with the present disclosure to mate trim cover 12 either with seat pan (backrest) 14 or seat pan (bottom frame) 114.

Deformable key 20 further including an elastic flange 24 coupled to the flange-support strip 22. Key retainer 30 comprises an open-sided sleeve 31 and a sleeve rigidifier 32. Open-sided sleeve 31 is configured to have a J-shaped profile and mate with elastic flange 24 of deformable key 20 as suggested in FIGS. 5-7. Sleeve rigidifier 32 is encapsulated in open-sided sleeve 31 and defined by a series of laterally spaced-apart coil inserts 33 that are configured and arranged to rigidify open-sided sleeve 31 as suggested in FIG. 4. The open-sided sleeve 31 is made of a first material (e.g. a plastics material) and the coil inserts 33 are made of a second material (e.g. a metallic material) that is more rigid than the first material.

Open-sided sleeve 31 includes a bight 34 formed to include a key-receiver channel 37 and a motion-blocker ridge 35 coupled to an interior surface of bight 34 as suggested in FIG. 3. Motion-blocker ridge 35 is arranged to extend into key-receiver channel 37 to mate with elastic flange 24 of a deformable key 20 located in key-receiver channel 37 as suggested in FIGS. 6 and 7 to retain deformable key 20 in mating engagement with key retainer 30.

Coil inserts 33 are encapsulated in bight 34 as suggested in FIGS. 3 and 4. Bight 34 is made of a plastics material and each coil insert 33 is made of a metal material. Each of the bight 34 and the coil inserts 33 is U-shaped in cross-section as suggested in FIGS. 3 and 4.

Each coil insert 33 includes a first leg 331, a second leg 332, and a leg connector 333 arranged to interconnect the first and second legs 331, 332 as suggested in FIG. 4. First and second legs 331, 332 are arranged to lie in spaced-apart relation to one another to locate the motion-blocker ridge 35 therebetween as also suggested in FIG. 4.

A channel portion 22C of flange-support strip 22 of deformable key 20 is arranged to lie in key-receiver channel 37 between motion-blocker ridge 35 and the second leg 332 of each coil insert 33 when a portion of the deformable key 20 is located in the key-receiver channel 37 formed in bight 34 to cause elastic flange 24 to mate with motion-blocker ridge 35 as suggested in FIG. 6. Channel portion of flange-support strip 22 is positioned to lie between the first and second legs 331, 332 of each coil insert 33 as suggested in FIG. 3.

Bight 34 includes an upper leg 34U, a lower leg 34L arranged to lie in spaced-apart relation to upper leg 34U, and a middle leg 34M arranged to interconnect upper and lower legs 34U, 34L as suggested in FIGS. 3 and 4. Motion-blocker ridge 35 of open-sided sleeve 31 is arranged to extend downwardly from upper leg 34U of bight 34 toward lower leg 34L of bight 34 to define a flange-retainer cavity 38 between the middle leg 34M of the bight 34 and motion-blocker ridge 35. Elastic flange 24 of deformable key 20 is located in the flange-retainer cavity 38 to mate with motion-blocker ridge 35 when deformable key 20 is located in the key-receiver channel 37 formed in bight 34 as suggested in FIG. 7.

Motion-blocker ridge 35 includes a sloped cam surface 35C and a flat stop surface 35S as suggested in FIG. 3. Sloped cam surface 35C faces away from middle leg 34M of bight 34 and a flat stop surface 35S facing toward middle leg 34M of bight 34 and engaged to a free end of elastic flange 24 to block withdrawal of deformable key 20 from the key-receiver channel 37 formed in bight 34 as suggested in FIG. 7.

Open-sided sleeve 31 includes, in series, as suggested in FIG. 1, a vertically extending left-side segment 311, a horizontally extending top segment 312, and a vertically extending right-side segment 313 as suggested in FIG. 1. A series of laterally spaced-apart coil inserts 33 comprises three groups G1, G2, G3 of coil inserts 33. A first group G1 of coil inserts 33 is encapsulated in the vertically extending left-side segment 311 of open-sided sleeve 31 and arranged to establish a first vertically extending array of encapsulated coil inserts 33. A second group G2 of coil inserts 33 is encapsulated in the horizontally extending top segment 312 of open-sided sleeve 31 and arranged to establish a horizontally extending array of encapsulated coil inserts 33. A third group G3 of coil inserts 33 is encapsulated in the vertically extending right-side segment 313 of open-sided sleeve 31 and arranged to establish a second vertically extending array of encapsulated coil inserts 33.

Each segment 311-313 of the open-sided sleeve 31 includes a bight 34 formed to encapsulate one of the groups G1, G2, G3 of coil inserts 33 and formed to include a key-receiver channel 37 and a side aperture 37A opening into the key-receiver channel 37 as suggested in FIG. 1. The key-receiver channel 37 formed in the bight 34 included in the vertically extending left-side segment 311 is arranged to open through the side aperture toward a side aperture associated with the key-receiver channel 37 formed in the bight 34 associated with the vertically extending right-side segment 313.

Each segment 311-313 of open-sided sleeve 31 further includes a motion-blocker ridge 35 coupled to the bight 34 associated with such segment 311, 312, or 313 as suggested in FIG. 1. Motion-blocker ridge 35 is arranged to extend into the key-receiver channel 37 formed therein to mate with the elastic flange 24 of a deformable key 20 located in such key-receiver channel 37 as suggested in FIG. 3. Each of the bights 34 is U-shaped in cross-section. Each of the coil inserts 33 is U-shaped in cross-section.

Trim-cover fastener 10 is coupled to a trim cover 12 and to a seat pan 14 or 114 to form an occupant-support base 16 or 116 of a vehicle seat 17 as suggested in FIG. 1A. Flange-support strip 22 of deformable key 20 is arranged to extend along and is coupled to a generally U-shaped rear perimeter edge of trim cover 12 as suggested in FIG. 1. Key retainer 30 includes a bight 34 formed to encapsulate the coil inserts 33 and mate with deformable key 20 and a pan-mount portion coupled to bight 34 and the seat pan 14 to hold trim cover 12 in place on the seat pan 14 as suggested in FIGS. 1-3.

Bight 34 of open-sided sleeve 31 has a U-shaped cross-section as suggested in FIG. 4. Bight 34 is formed to include a key-receiver channel 37 that is arranged to open in a direction facing toward the pan-mount portion 36 of key retainer 30. Elastic flange 24 extends into the key-receiver channel 37 of key retainer 30 when deformable key 20 is mated to key retainer 30 as suggested in FIG. 7. Key-receiver channel 37 is arranged to extend along the entire length of the bight 34 as suggested in FIG. 3. Key retainer 30 further includes a motion-blocker ridge 35 that is arranged to extend downwardly from an upper leg 34U of bight 34 toward a lower leg 34L of bight 34 to define a flange-retainer cavity 38 between a middle leg 34M of bight 34 and motion-blocker ridge 35 as suggested in FIG. 3. Middle leg 34M is arranged to interconnect the upper and lower legs 34U, 34L. Each of the upper, middle, and lower legs 34U, 34M, 34L of the bight 34 extends along the entire length of the bight 34 as suggested in FIG. 3.

A sewing flange is created in accordance with the present disclosure by maintaining the key-receiver channel 37 in part using the groups G1, G2, G3 of metal coil inserts as suggested in FIGS. 1 and 4 and providing an extension to lower leg 34L of bight 34 to cause the length of lower leg 34L to be greater than the length of upper leg 34U as suggested in FIG. 3. A trim-cover fastener 10 in accordance with the present disclosure provides flexibility to sewing around curvature of parts to secure attachment without using plastics material which is too soft. Trim cover 12 is aligned and secured to soft or semi-rigid parts using a trim-cover fastener 10 in accordance with the present disclosure.

Key retainer 30 is coupled to a semi-rigid part and key 20 is coupled to trim cover 12 using two independent attachments in accordance with the present disclosure to split the semi-rigid part and the trim cover completely to avoid difficult sewing operations. A non-visible attachment feature is provided in a semi-rigid part which is greater than 50 shore (hardness scale) when the semi-rigid part is not strong enough to be used as direct attachment of cover parts.

Key retainer 30 can be attached easily to a semi-rigid part in accordance with the present disclosure without having to manage a full trim cover 12 during an assembly process. Key retainer 30 can flex easily around radius of rigid parts yet has high retention owing to encapsulation of metal coil inserts 33. Key retainer 30 can match contour of rigid part to provide positive location for attachment. Key retainer 30 can provide a consistent surface to maintain continuous radius without visible gaps between attachment points.

The following numbered clauses include embodiments that are contemplated and non-limiting:

Clause 1. A Trim-Cover Fastener Comprising a deformable key including a flange-support strip adapted to mate with a trim cover that is configured to cover a seat pan and cooperate with the seat pan to form an occupant-support base of a vehicle seat, the deformable key further including an elastic flange coupled to the flange-support strip, and a key retainer comprising an open-sided sleeve configured to have a J-shaped profile and mate with the elastic flange of the deformable key and a sleeve rigidifier encapsulated in the open-sided sleeve and defined by a series of laterally spaced-apart coil inserts that are configured and arranged to rigidify the open-sided sleeve, wherein the open-sided sleeve is made of a first material and the coil inserts are made of a second material that is more rigid than the first material.

Clause 2. The trim-cover fastener of any other clause, wherein the open-sided sleeve includes a bight formed to include a key-receiver channel and a motion-blocker ridge coupled to an interior surface of the bight and arranged to extend into the key-receiver channel to mate with the elastic flange of a deformable key located in the key-receiver channel to retain the deformable key in mating engagement with the key retainer, and the coil inserts are encapsulated in the bight.

Clause 3. The trim-cover fastener of any other clause, wherein the bight is made of a plastic material and each coil insert is made of a metal material.

Clause 4. The trim-cover fastener of any other clause, wherein each of the bight and the coil inserts is U-shaped in cross-section.

Clause 5. The trim-cover fastener of any other clause, wherein each coil insert includes a first leg, a second leg, and a leg connector arranged to interconnect the first and second legs, and the first and second legs are arranged to lie in spaced-apart relation to one another to locate the motion-blocker ridge therebetween.

Clause 6. The trim-cover fastener of any other clause, wherein a channel portion of the flange-support strip of the deformable key is arranged to lie in the key-receiver channel between the motion-blocker ridge and the second leg of each coil insert when a portion of the deformable key is located in the key-receiver channel formed in the bight to cause the elastic flange to mate with the motion-blocker ridge.

Clause 7. The trim-cover fastener of any other clause, wherein the channel portion of the flange-support strip is positioned to lie between the first and second legs of each coil insert.

Clause 8. The trim-cover fastener of any other clause, wherein the bight is made of a plastics material and each coil insert is made of a metal material.

Clause 9. The trim-cover fastener of any other clause, wherein each of the bight and the coil inserts is U-shaped in cross-section.

Clause 10. The trim-cover fastener of any other clause, wherein the bight includes an upper leg, a lower leg arranged to lie in spaced-apart relation to the upper leg, and a middle leg arranged to interconnect the upper and lower legs and the motion-blocker ridge of the open-sided sleeve is arranged to extend downwardly from the upper leg of the bight toward the lower leg of the bight to define a flange-retainer cavity between the middle leg of the bight and the motion-blocker ridge and the elastic flange of the deformable key is located in the flange-retainer cavity to mate with the motion-blocker ridge when the deformable key is located in the key-receiver channel formed in the bight.

Clause 11. The trim-cover fastener of any other clause, wherein the motion-blocker ridge includes a sloped cam surface facing away from the middle leg of the bight and a flat stop surface facing toward the middle leg of the bight and engaged to a free end of the elastic flange to block withdrawal of the deformable key from the key-receiving channel formed in the bight.

Clause 12. The trim-cover fastener of any other clause, wherein the open-sided sleeve includes, in series, a vertically extending left-side segment, a horizontally extending top segment, and a vertically extending right-side segment, the series of laterally spaced-apart coil inserts comprises a first group of coil inserts encapsulated in the vertically extending left-side segment of the open-sided sleeve and arranged to establish a first vertically extending array of encapsulated coil inserts, a second group of coil inserts encapsulated in the horizontally extending top segment of the open-sided sleeve and arranged to establish a horizontally extending array of encapsulated coil inserts, and a third group of coil inserts encapsulated in the vertically extending right-side segment of the open-sided sleeve and arranged to establish a second vertically extending array of encapsulated coil inserts.

Clause 13. The trim-cover fastener of any other clause, wherein each segment of the open-sided sleeve includes a bight formed to encapsulate one of the groups of coil inserts and formed to include a key-receiver channel and a side aperture opening into the key-receiver channel and the key-receiver channel formed in the bight included in the vertically extending left-side segment is arranged to open through the side aperture toward a side aperture associated with the key-receiver channel formed in the bight associated with the vertically extending right-side segment.

Clause 14. The trim-cover fastener of any other clause, wherein each segment of the open-sided sleeve further includes a motion-blocker ridge coupled to the bight associated with such segment and arranged to extend into the key-receiver channel formed therein to mate with the elastic flange of a deformable key located in such key-receiver channel.

Clause 15. The trim-cover fastener of any other clause, wherein each of the bights is U-shaped in cross-section.

Clause 16. The trim-cover fastener of any other clause, wherein each of the coil inserts is U-shaped in cross-section.

Clause 17. The trim-cover fastener of any other clause, in combination with a seat pan and a trim cover for the seat pan, and wherein the trim-cover fastener is coupled to the trim cover and to the seat pan to form an occupant-support base of a vehicle seat, the flange-support strip of the deformable key is arranged to extend along and is coupled to a generally U-shaped rear perimeter edge of the trim cover, and the key retainer includes a bight formed to encapsulate the coil inserts and mate with the deformable key and a pan-mount portion coupled to the bight and the seat pan to hold the trim cover in place on the seat pan.

Clause 18. The trim-cover fastener of any other clause, wherein the bight of the open-sided sleeve has a U-shaped cross-section and is formed to include a key-receiver channel that is arranged to open in a direction facing toward the pan-mount portion of the key retainer and the elastic flange extends into the key-receiver channel of the key retainer when the deformable key is mated to the key retainer.

Clause 19. The trim-cover-fastener of any other clause, wherein the key-receiver channel is arranged to extend along the entire length of the bight.

Clause 20. The trim-cover fastener of any other clause, wherein the key retainer further includes a motion-blocker ridge that is arranged to extend downwardly from an upper leg of the bight toward a lower leg of the bight to define a flange-retainer cavity between a middle leg of the bight and the motion-blocker ridge and the middle leg is arranged to interconnect the upper and lower legs.

Clause 21. The trim-cover fastener of any other clause 0, wherein each of the upper, middle, and lower legs of the bight extends along the entire length of the bight.

The invention claimed is:
1. A trim-cover fastener comprising
a deformable key including a flange-support strip adapted to mate with a trim cover that is configured to cover a seat pan and cooperate with the seat pan to form an occupant-support base of a vehicle seat, the deformable key further including an elastic flange coupled to the flange-support strip, and
a key retainer comprising an open-sided sleeve configured to have a J-shaped profile and mate with the elastic flange of the deformable key and a sleeve rigidifier encapsulated in the open-sided sleeve and defined by a series of laterally spaced-apart coil inserts that are configured and arranged to rigidify the open-sided sleeve, wherein the open-sided sleeve is made of a first material and the series of laterally spaced-apart coil inserts are made of a second material that is more rigid than the first material,
wherein the open-sided sleeve includes a bight formed to include a key-receiver channel and a motion-blocker ridge coupled to an interior surface of the bight and arranged to extend into the key-receiver channel to mate with the elastic flange of the deformable key located in the key-receiver channel to retain the deformable key in mating engagement with the key retainer, and wherein each coil insert of the series of laterally spaced-apart coil inserts includes a first leg, a second leg, and a leg connector arranged to interconnect the first and second legs, and the first and second legs are spaced-apart in relation to one another to locate the motion-blocker ridge therebetween,
wherein the motion-blocker ridge and the first leg, second leg, and leg connector of the coil insert lie in a first plane.

2. The trim-cover fastener of claim 1, wherein the series of laterally spaced-apart coil inserts are encapsulated in the bight.

3. The trim-cover fastener of claim 2, wherein the bight is made of a plastic material and each coil insert of the series of laterally spaced-apart coil inserts is made of a metal material.

4. The trim-cover fastener of claim 2, wherein each of the bight and the series of laterally spaced-apart coil inserts is U-shaped in cross-section.

5. The trim-cover fastener of claim 1, wherein a channel portion of the flange-support strip of the deformable key is arranged to lie in the key-receiver channel between the motion-blocker ridge and the second leg of each coil insert of the series of laterally spaced-apart coil inserts when a portion of the deformable key is located in the key-receiver channel formed in the bight to cause the elastic flange to mate with the motion-blocker ridge.

6. The trim-cover fastener of claim 5, wherein the channel portion of the flange-support strip is positioned to lie between the first and second legs of each coil insert of the series of laterally spaced-apart coil inserts.

7. The trim-cover fastener of claim 6, wherein the bight is made of a plastic material and each coil insert of the series of laterally spaced-apart coil inserts is made of a metal material.

8. The trim-cover fastener of claim 6, wherein each of the bight and the series of laterally spaced-apart coil inserts is U-shaped in cross-section.

9. The trim-cover fastener of claim 2, wherein the bight includes an upper leg, a lower leg arranged to lie in spaced-apart relation to the upper leg, and a middle leg arranged to interconnect the upper and lower legs and the motion-blocker ridge of the open-sided sleeve is arranged to extend downwardly from the upper leg of the bight toward the lower leg of the bight to define a flange-retainer cavity between the middle leg of the bight and the motion-blocker ridge and the elastic flange of the deformable key is located in the flange-retainer cavity to mate with the motion-blocker ridge when the deformable key is located in the key-receiver channel formed in the bight.

10. The trim-cover fastener of claim 9, wherein the motion-blocker ridge includes a sloped cam surface facing away from the middle leg of the bight and a flat stop surface facing toward the middle leg of the bight and engaged to a free end of the elastic flange to block withdrawal of the deformable key from the key-receiving channel formed in the bight.

11. The trim-cover fastener of claim 1, wherein the open-sided sleeve includes, in series, a vertically extending left-side segment, a horizontally extending top segment, and a vertically extending right-side segment, the series of laterally spaced-apart coil inserts comprises a first group of coil inserts encapsulated in the vertically extending left-side segment of the open-sided sleeve and arranged to establish a first vertically extending array of encapsulated coil inserts, a second group of coil inserts encapsulated in the horizontally extending top segment of the open-sided sleeve and arranged to establish a horizontally extending array of encapsulated coil inserts, and a third group of coil inserts encapsulated in the vertically extending right-side segment of the open-sided sleeve and arranged to establish a second vertically extending array of encapsulated coil inserts.

12. The trim-cover fastener of claim 11, wherein the bight encapsulates each of the groups of coil inserts and is formed to include side aperture opening into the key-receiver channel and the key-receiver channel formed in the bight included in the vertically extending left-side segment is arranged to open through the side aperture toward a side aperture associated with the key-receiver channel formed in the bight associated with the vertically extending right-side segment.

13. The trim-cover fastener of claim 12, wherein each segment of the open-sided sleeve includes the motion-blocker ridge coupled to the bight associated with such segment and arranged to extend into the key-receiver channel formed therein to mate with the elastic flange of the deformable key located in such key-receiver channel.

14. The trim-cover fastener of claim 11, wherein each of the bights is U-shaped in cross-section.

15. The trim-cover fastener of claim 11, wherein each of the coil inserts of the series of laterally spaced-apart coil inserts is U-shaped in cross-section.

16. The trim-cover fastener of claim 1, in combination with a seat pan and a trim cover for the seat pan, and wherein the trim-cover fastener is coupled to the trim cover and to the seat pan to form an occupant-support base of a vehicle seat, the flange-support strip of the deformable key is arranged to extend along and is coupled to a generally U-shaped rear perimeter edge of the trim cover, and the key retainer includes a pan-mount portion coupled to the bight and the seat pan to hold the trim cover in place on the seat pan.

17. The trim-cover fastener of claim 16, wherein the bight of the open-sided sleeve encapsulates the series of laterally spaced-apart coil inserts and has a U-shaped cross-section, the key-receiver channel is arranged to open in a direction facing toward the pan-mount portion of the key retainer and the elastic flange extends into the key-receiver channel of the key retainer when the deformable key is mated to the key retainer.

18. The trim-cover-fastener of claim 17, wherein the key-receiver channel is arranged to extend along the entire length of the bight.

19. The trim-cover fastener of claim 17, wherein the motion-blocker ridge is arranged to extend downwardly from an upper leg of the bight toward a lower leg of the bight to define a flange-retainer cavity between a middle leg of the bight and the motion-blocker ridge and the middle leg is arranged to interconnect the upper and lower legs.

20. A trim-cover fastener comprising
a deformable key including a flange-support strip adapted to mate with a trim cover that is configured to cover a seat pan and cooperate with the seat pan to form an occupant-support base of a vehicle seat, the deformable key further including an elastic flange coupled to the flange-support strip, and
a key retainer comprising an open-sided sleeve configured to have a J-shaped profile and mate with the elastic flange of the deformable key and a sleeve rigidifier encapsulated in the open-sided sleeve and defined by a series of laterally spaced-apart coil inserts that are configured and arranged to rigidify the open-sided sleeve, wherein the open-sided sleeve is made of a first material and the series of laterally spaced-apart coil inserts are made of a second material that is more rigid than the first material,
wherein the key retainer includes a bight formed to encapsulate each of the coil inserts of the series of laterally spaced-apart coil inserts and mate with the deformable key and a motion-blocker ridge that is arranged to extend downwardly from an upper leg of the bight toward a lower leg of the bight to define a flange-retainer cavity between a middle leg of the bight and the motion-blocker ridge and the middle leg is arranged to interconnect the upper and lower legs,
wherein the coil insert, the motion-blocker ridge, and the upper leg, the middle leg, and the lower leg of the bight all lie in a first plane, and
wherein each of the upper, middle, and lower legs of the bight extends along the entire length of the bight.

* * * * *